United States Patent [19]
Baxter, Jr.

[11] Patent Number: 5,613,587
[45] Date of Patent: Mar. 25, 1997

[54] TRANSFER CASE FRICTION PLATE SYNCHRONIZER

[75] Inventor: Ralph W. Baxter, Jr., Fort Wayne, Ind.

[73] Assignee: Dana Corporation, Toledo, Ohio

[21] Appl. No.: 400,708

[22] Filed: Mar. 8, 1995

[51] Int. Cl.$^6$ ................................................... F16D 13/54
[52] U.S. Cl. .................. 192/53.32; 192/53.1; 192/70.22; 74/665 F; 74/665 GE
[58] Field of Search ............................... 192/53.1, 53.32, 192/70.11, 70.22, 70.2; 74/665 F, 665 GE, 665 G; 475/204; 180/233, 247

[56] References Cited

U.S. PATENT DOCUMENTS

| | | | |
|---|---|---|---|
| 4,047,602 | 9/1977 | Crankshaw | 192/53 F |
| 4,131,185 | 12/1978 | Schall . | |
| 4,369,671 | 1/1983 | Matsumoto et al. . | |
| 4,422,349 | 12/1983 | Matsumoto et al. . | |
| 4,649,771 | 3/1987 | Atkinson et al. . | |
| 4,920,828 | 5/1990 | Kameda et al. | 475/204 X |
| 5,380,255 | 1/1995 | Brissenden et al. | 475/204 |

Primary Examiner—Andrea L. Pitts
Attorney, Agent, or Firm—Oldham & Oldham Co., LPA

[57] ABSTRACT

A friction plate synchronizer/brake apparatus for use in a drivetrain subassembly such as a four-wheel drive transfer case. The apparatus provides a relatively small and lightweight apparatus that may be used to facilitate transfer case range shift operations by smoothly eliminating residual rotation of the transfer case input shaft caused by torque converter drag. Elimination of the torque converter drag allows the transfer case output drive shaft to be coupled to the transfer case input shaft or to the associated planetary gear assembly without excessive noise, vibration, or wear on the transfer case components. The apparatus also provides a relatively small and lightweight apparatus to be used in a four-wheel drive transfer case to facilitate smooth "on the fly" shifting between two-wheel and four-wheel drive modes of operation. The apparatus synchronizes the rotational speeds of a transfer case drive shaft and the four-wheel drive sprocket mounted about the drive shaft, allowing the direct engagement of these components without excessive noise, vibration and wear on the associated components.

17 Claims, 3 Drawing Sheets 5,613,587

TRANSFER CASE FRICTION PLATE SYNCHRONIZER

FIELD OF INVENTION

The present invention relates generally to a friction plate synchronizer for use in a drivetrain subassembly, and more particularly to a preloaded friction plate synchronizer for use in a four-wheel drive torque transfer case.

BACKGROUND OF THE INVENTION

Many different arrangements are known for manufacturing a transfer case capable of transferring torque from the input shaft thereof to both a front and rear output shaft to provide four-wheel drive. One particular design utilizes a drive sprocket rotatably mounted about the drive shaft and connected by a chain to a second sprocket coupled to rotate with the front output shaft. During two wheel drive mode, the drive shaft rotates without transferring torque to the drive sprockets. However, when in four-wheel drive mode, the drive sprocket mounted about the drive shaft is coupled to the drive shaft to receive torque therefrom and transfer the torque through the drive chain to the front output shaft.

One method of selectively coupling the drive shaft to the drive sprocket is to provide a four-wheel drive clutch. The four-wheel drive clutch must be relatively large to be capable of transferring sufficient torque to drive the front wheels of the vehicle. However, the increasing popularity of four-wheel drive vehicles has led to the demand for smaller, lighter-weight, and less expensive transfer cases that may be used on trucks as well as passenger cars. The presence of a four-wheel drive clutch limits the ability of designers to reduce the size and weight of transfer cases.

Transfer cases may also be designed to provide a choice among a high speed range, a low speed range, or a neutral range. Although range shift operations are ordinarily performed when the motor vehicle transmission is in neutral, if the vehicle has an automatic transmission, the transmission may continue to transmit torque to the input shaft of the transfer case for a brief time because of a phenomenon known as torque converter drag. During range shift operations, such as when the vehicle driver shifts the transfer case from low or neutral into the high speed range or into the low speed range from the high speed range, the stationary components associated with the intermediate drive shaft of the transfer case must be coupled with the rotating torque input shaft or components connected thereto. Without a synchronizer/brake assembly, the torque converter drag causes a difference in rotational speed between the input shaft and the non-rotating intermediate drive shaft during coupling operations and evidences itself as ratcheting between the gears or clunking which results in noise, vibration, and wear on the shafts and gears.

SUMMARY OF THE INVENTION

The present invention is therefore directed to a friction plate synchronizer for use in a drivetrain subassembly such as a torque transfer case to facilitate the synchronous coupling of a first rotatable member to a second rotatable member, the friction plate synchronizer comprising a first friction plate set including at least one first friction plate secured for rotation with the first rotatable member and a second friction plate set including at least one second friction plate maintained in frictional engagement with the first friction plate set by at least one spring, wherein the second friction plate set is selectively engageable with the second rotatable member such that upon engagement of the second rotatable member and the second friction plate set, the first friction plate set and the second friction plate set cooperate to facilitate the synchronous coupling of the first and second rotatable members.

The friction plate synchronizer provides the advantage of facilitating the smooth engagement of components of a drivetrain subassembly.

DETAILED DESCRIPTION OF THE INVENTION

Figure 1:
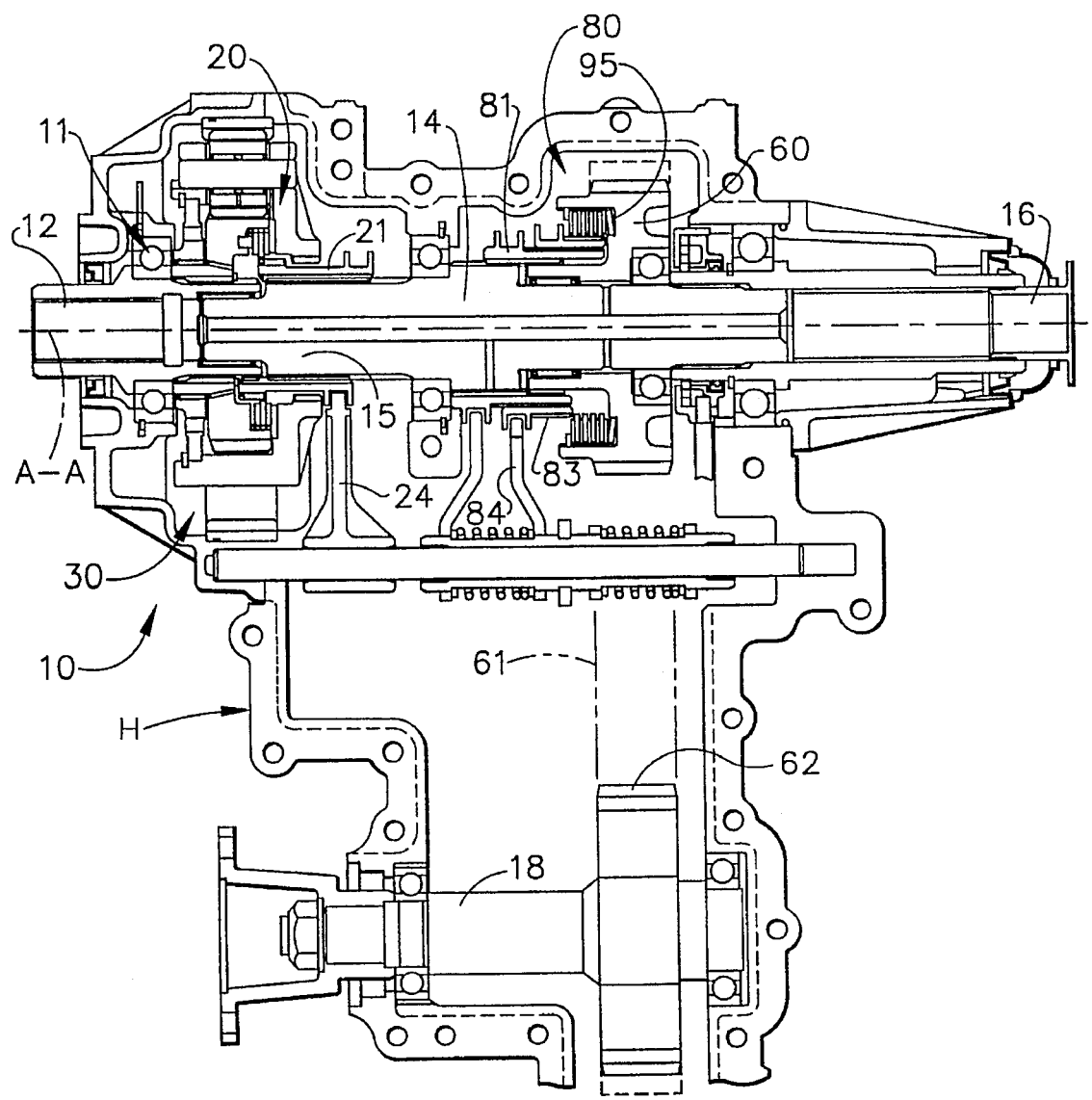
FIG. 1 is a cross-sectional view illustrating a torque transfer case incorporating the present invention.

FIG. 1 illustrates a four-wheel drive transfer case 10 utilizing a range shift friction plate synchronizer 20 and a four-wheel drive shift friction plate synchronizer 80 in accordance with the present invention. Transfer case 10 receives torque from a torque input shaft 12 which is coupled to a motor vehicle transmission and transmits torque to a drive shaft such as an intermediate drive shaft 14 through a planetary gear set 30 as is described more completely hereinbelow. A rear output shaft 16 is splined or otherwise connected to intermediate drive shaft 14 (or may be integrally connected with intermediate drive shaft 14) to receive torque therefrom and to transfer torque to the rear differential (not shown) of the vehicle. Transfer case 10 also includes a front output shaft 18 for receiving torque from intermediate drive shaft 14 and transmitting torque to the front differential (not shown) of the vehicle.

Figure 2:
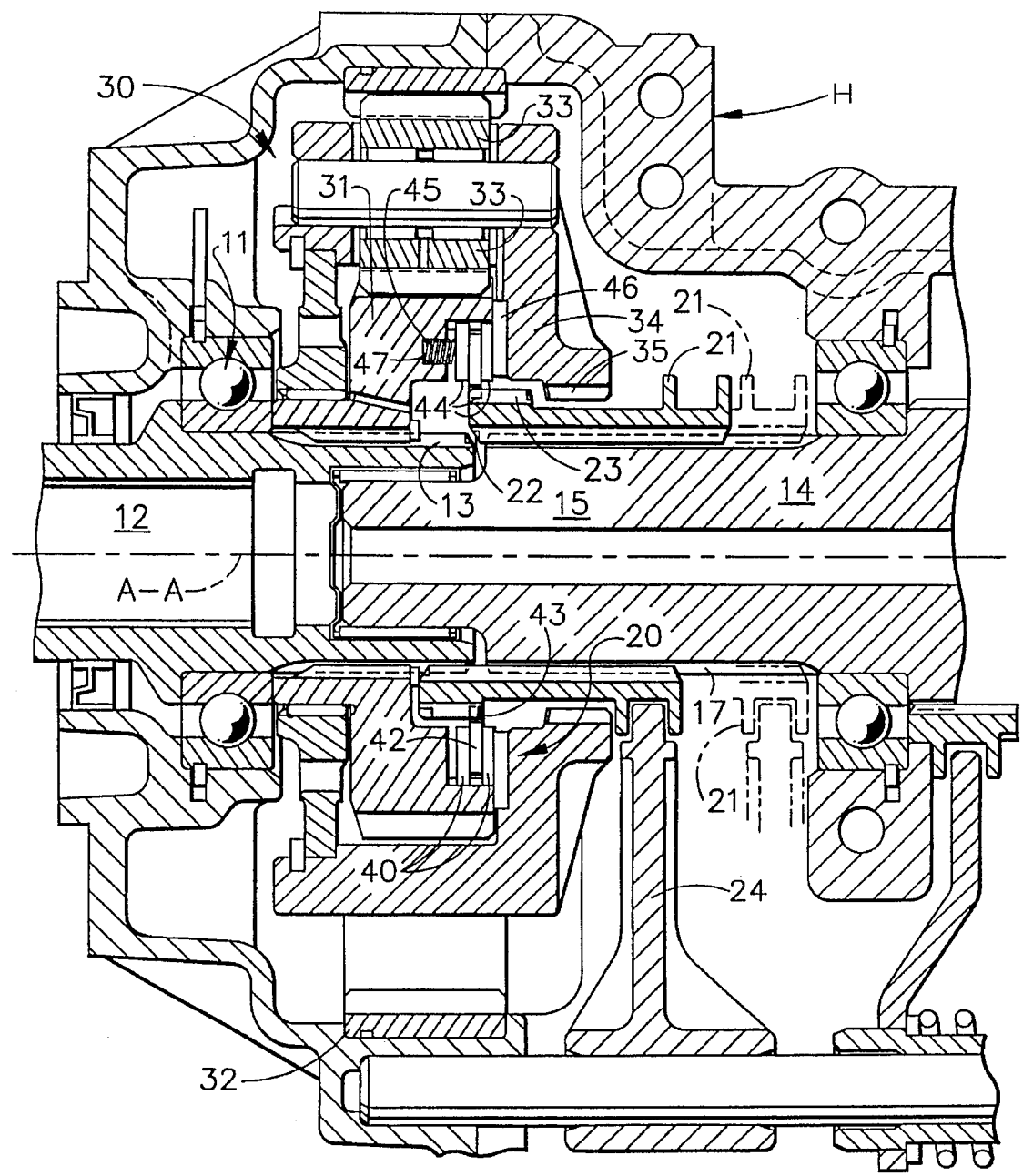
FIG. 2 is a cross-sectional view showing the front portion of the transfer case illustrated in FIG. 1.

As may be more clearly seen in FIG. 2, input shaft 12 is rotatably supported at the forward end of the transfer case 10 by a bearing assembly 11 and incorporates a sun gear 31 which forms part of a planetary gear reduction assembly, generally indicated at 30, used to achieve the low gear or low speed operating range of the transfer case 10. The planetary gear assembly 30 also includes a ring gear 32 fixed relative to the housing H, and a plurality of planet gears 33 circumferentially spaced and individually rotatably supported by a planet carrier 34.

The intermediate drive shaft 14 is rotatably supported within transfer case housing H and carries at its forward end 15 an axially moveable range shift sleeve 21 secured for rotation with shaft 14 by a splined connection. Range shift sleeve 21 has internal splines 22 to provide the splined connection with the external splines 17 of intermediate drive shaft 14, and to provide a driving connection with external teeth or splines 13 of input shaft 12 as will be discussed in more detail below. Shift sleeve 21 also includes external teeth or splines 23 for selective engagement with teeth 35 provided on planetary carrier 34.

When shift sleeve 21 is slid most axially forward along the axis A—A, internal splines 22 of shift sleeve 21 engage external splines 13 of input shaft 12, as is shown below the axis A—A in FIGS. 1 and 2. In this position, there is a direct drive connection or engagement between input shaft 12 and intermediate drive shaft 14 to provided the high speed or high gear range of the transfer case 10. In high gear two wheel drive mode, torque from input shaft 12 is transferred directly to rear output shaft 16 through intermediate drive shaft 14. If four-wheel drive mode has been selected by the driver of the vehicle, the front drive shaft 18 will also receive torque from the intermediate drive shaft 14 as is described in more detail below.

When range shift sleeve 21 is moved most axially rearward along the axis A—A as is partially shown with broken lines, external teeth 23 of shift sleeve 21 are engaged with teeth 35 of planet carrier 34 so that the planetary gear assembly 30 introduces a predetermined gear reduced torque to intermediate drive shaft 14 through sleeve 21 to provide the low speed range of the transfer case 10. When in two wheel drive mode, this low speed torque is transferred to the rear output shaft 16 through intermediate drive shaft 14. When a driver has selected the four-wheel drive mode of the transfer case 10, this reduced speed torque is also transferred from the intermediate drive shaft 14 to the front output shaft 18.

Shift sleeve 21 may also be located at an axially intermediate or neutral position where it is coupled to neither the teeth 13 of input shaft 12 nor teeth 35 of planet carrier 34. In this neutral position, the rotating input shaft 12 is unable to transfer torque to intermediate drive shaft 14. The driver of the vehicle can control the axial position of range shift sleeve 21 by mechanical means, electrical means or a combination thereof as is well known in the art to select the high, low, or neutral range of the transfer case 10. In the embodiment shown in FIGS. 1 through 3, a range shift actuator 24 is used to selectively move range shift sleeve 21 between the various drive modes discussed above.

One application of the present invention concerns the use of a specially designed preloaded friction plate synchronizer assembly shown generally at 20 to facilitate smooth engagement of the range shift sleeve 21 with torque input shaft 12 when the driver of the vehicle shifts the transfer case 10 into the high speed range, and to facilitate smooth engagement of teeth 23 of range shift sleeve 21 with the teeth 35 of planet carrier 34 when the driver of the vehicle selects the low speed range from neutral or from the high speed range. As was previously mentioned, even though the vehicle transmission is in neutral and the vehicle is stationary during range shift operations, the torque converter of the vehicle, if so equipped, causes input shaft 12 to continue to rotate for a period of time after the vehicle has been driven. It has been found, however, that if the input shaft 12 of the transfer case 10 is held against rotation for a brief time, the force of the torque converter drag can be disrupted and will not thereafter cause input shaft 12 to substantially rotate until after the vehicle is once again driven. Therefore, range shift synchronizer 20 is designed to act as a brake to cause input shaft 12 and the components rotating therewith such as sun gear 31 and planet carrier 34 to smoothly slow down or stop (thereby eliminating torque converter drag). Once the torque converter drag is substantially eliminated (which occurs rapidly using the present invention), input shaft 12 and planet carrier 34 are substantially stationary allowing range shift sleeve 21 to be coupled to either shaft 12 or planet carrier 34 without ratcheting or clunking of the components. Although range shift synchronizer acts as a brake during range shift operations, those skilled in the art will recognize that braking as described herein is only a special case of synchronization that causes two components to rotate at substantially the same speed.

The preloaded friction plate synchronizer assembly 20 includes a first friction plate set defined and shown as at least one first or primary friction plate 40 splined or otherwise secured to sun gear 31 to rotate therewith. A second friction plate set is defined and shown as at least one second or secondary friction plate 42 maintained in frictional engagement with primary friction plates 40 by at least one spring 45 as is discussed in more detail below. The primary and secondary friction plates 40,42 are arranged coaxial to intermediate drive shaft 14 and each friction plate 40,42 includes an inner diameter 44 defining a central aperture capable of slidably receiving range shift sleeve 21 when sleeve 21 is moved axially to and from the various shift positions. Secondary friction plate 42 contains internal splines 43 to engage external splines 23 of range shift sleeve 21 (as is shown above the axis A—A in FIG. 2) when range shift sleeve 21 is moved axially forward from the low speed or neutral position.

Because range shift operations are performed when the vehicle is stationary, intermediate drive shaft 14 is stationary during such range shifts. However, due to torque converter drag, primary and secondary friction plates 40,42 are rotating at the same speed as sun gear 31 and input shaft 12. When sleeve 21 is moved axially forward from the low or neutral position, engagement of splines 23 of sleeve 21 and internal splines 43 of secondary plate 42 causes secondary plate 42 to stop rotating. Friction between the rotating plates 40 and stationary plate 42 causes plates 40 and the parts to which plates 40 are connected such as input shaft 12, and planetary gear set 30 to rapidly lose speed or stop rotating to thereby eliminate the effects of torque converter drag. Therefore, as range shift sleeve 21 is moved further axially forward through central aperture of plates 40,42 as is shown below the axis A—A in FIG. 2, teeth 13 of input shaft 12 will more easily and smoothly become directly engaged with splines 22 of range shift sleeve to provide the high speed range of the transfer case 10.

Range shift synchronizer 20 also facilitates smooth shifting from high speed range into the low speed range. While in the high speed range as is shown below the axis A—A in FIGS. 1 and 2, input shaft 12, plates 40,42, range shift sleeve 21, and intermediate drive shaft 14 all rotate at the same speed. When the vehicle is stopped to perform a range shift into low, range shift sleeve 21 is moved axially rearward such that internal splines 22 of sleeve 21 become disengaged from teeth 13 of input shaft 12. However, external splines 23 of the non-rotating range shift sleeve 21 remain engaged with internal splines 43 of secondary friction plate 42 as is shown above the axis A—A to restrain secondary plate 42 from rotating with primary plates 40 in response to torque converter drag. Primary plates 40 will rotate in response to torque converter drag and are rapidly slowed or stopped because of the frictional interaction between plates 40 and 42. Sun gear 31 consequently slows or stops causing planet carrier 34 to slow or stop rotating. Further axially rearward movement of range shift sleeve disengages range shift sleeve 21 from friction plate 42 as is required for the low range position. Input shaft 12 and the components coupled thereto will not begin to rotate at any appreciable speed due to torque converter drag because the drag will have been substantially eliminated by the action of the range shift synchronizer 20 when it substantially stopped the rotation of the input shaft 12. Further axially rearward movement of the non-rotating range shift sleeve 21 allows external splines 23 of sleeve 21 to engage the teeth 35 of the non-rotating or substantially non-rotating planet carrier 34 to place the transfer case 10 into the low speed range of operation. In the low speed range, unlike the high speed range, range shift sleeve 21 must not be connected with plate 42. This is due to the inherent difference in rotational speed between the sun gear 31 and the planet carrier 34. If range shift sleeve 21 remains connected with plate 42 while sleeve 21 was in the low speed range, plate 42 would be forced to rotate at a slower speed than plates 40 for a substantial period of time which would destroy the plates 40,42 due to frictional forces between the plates 40,42.

Any rotation of the torque input shaft 12, sun gear 31, or planet carrier 34 not eliminated by the range shift synchronizer 20 will be minimal and may actually facilitate the coupling and uncoupling of the various components. Also, those skilled in the art will recognize that as described, range shift synchronizer 20 functions as a brake to slow of stop a rotating component so that it may be coupled to a non-rotating component. As used herein, the term "synchronizer" is meant to include a brake assembly as described, and those skilled in the art will recognize that slowing or stopping a rotating component to be coupled to a non-rotating component is merely a special case of synchronization.

In the preferred embodiment shown, secondary plate 42 maintained in frictional engagement with primary plates 40 by at least one spring such as a plurality of circumferentially spaced apart coil springs 45 (only one shown) disposed in a circumferentially spaced apart relationship around the friction plates 40,42 to bias the friction plates between the springs 45 and a stop or reaction member 46. Each spring 45 is located in a recess 47 formed in the sun gear 31. The torque capacity of the friction plate arrangement of the embodiment shown in FIG. 2 is given by the following equation:

$$T = \mu \cdot (\tfrac{2}{3}) \cdot p \cdot n \cdot ((R^3 - r^3)/(R^2 - r^2))$$

wherein, T is the torque capacity, $\mu$ is the coefficient of friction, p is the axial engaging force, n is the number of pairs of contact surfaces in the friction plate arrangement, and R and r are the outside radius of the friction plates and the inside radius of the friction material respectively. In a particular example, for use as the range shift synchronizer 20 of the invention, the friction plate arrangement may be configured with R=2.0625", r=1.625", $\mu$=0.1, n=2, and p=200 lbs., providing a torque capacity of the friction plate arrangement of 6.08 lb-ft. For preloading of this arrangement, 10 coil springs 45 may be used, each having a spring rate of 169.2 lb/inch, to provide a desired preloading force on the friction plate assembly 20.

Figure 3:
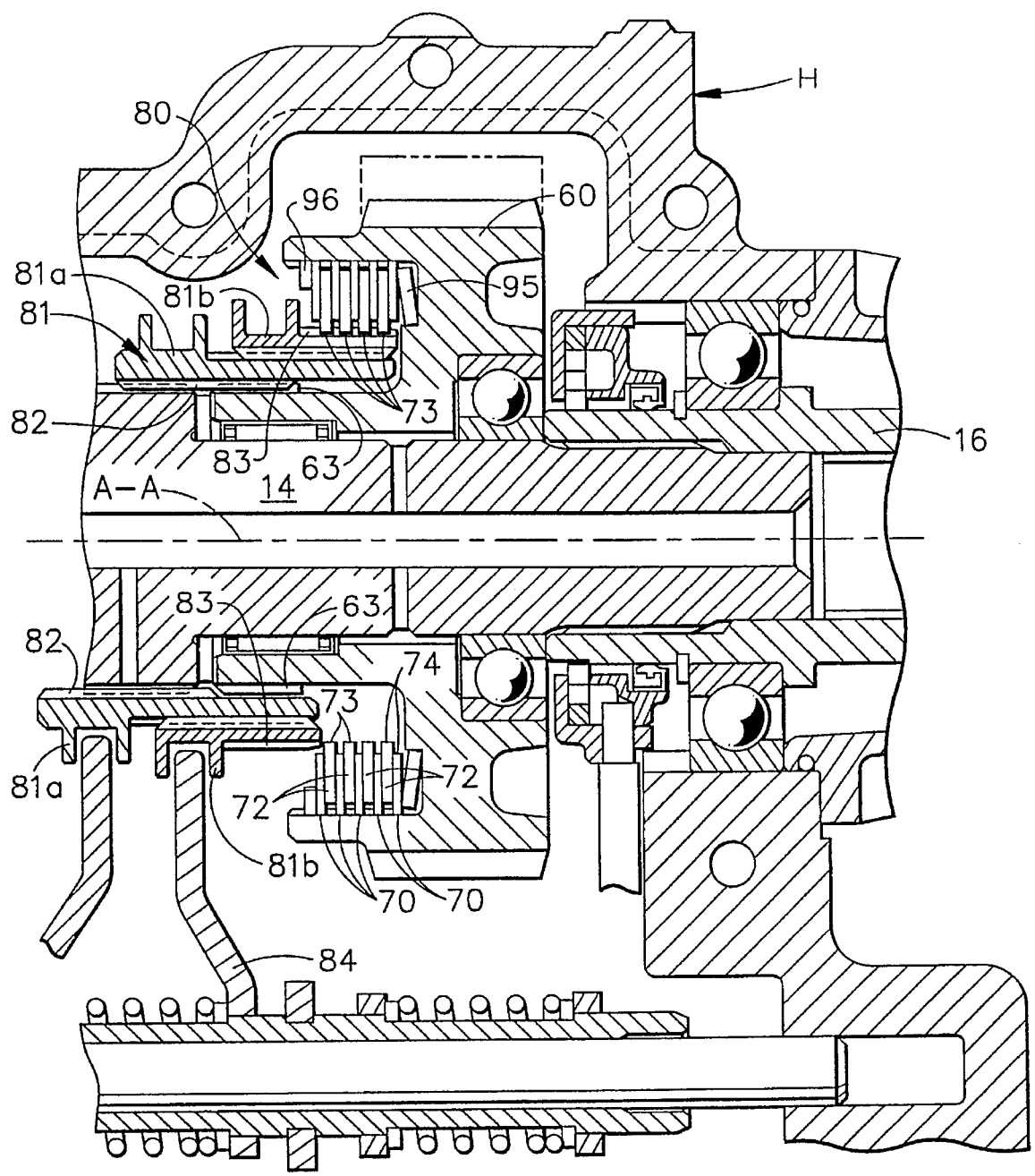
FIG. 3 is a cross-sectional view showing the rear portion of the transfer case illustrated in FIG. 1.

A second application of the present invention is shown generally at 80 in FIGS. 1 and 3 as a preloaded friction plate four-wheel drive shift synchronizer 80. The four-wheel drive friction plate synchronizer 80 facilitates shifting of the transfer case 10 between two-wheel and four-wheel drive modes of operation. In particular, four-wheel drive synchronizer 80 facilitates the so called "shift on the fly" procedure requiring the transfer case to be placed in four-wheel drive mode while the vehicle is being driven, and consequently while intermediate drive shaft 14 is rapidly rotating.

A four-wheel drive shift sleeve 81 containing internal teeth or splines 82 and external teeth or splines 83 is coaxially disposed about and secured for rotation by a splined connection with intermediate drive shaft 14. Four-wheel drive shift sleeve 81 may be made of first and second sleeve members 81a, 81b coupled to rotate with each other by a splined connection allowing axial movement of pieces 81a, 81b relative to each other. The two-piece design may facilitate proper operation of the four-wheel drive shift synchronizer 80, although a properly configured one-piece sleeve 81 may be used. Four-wheel drive shift sleeve 81 is moveable along axis A—A between a forward position shown below the axis A—A and a rear position as shown above the axis A—A. The driver of the vehicle containing transfer case 10 can control the axial position of four-wheel drive shift sleeve 81 by mechanical means, electrical means, or a combination thereof. In the particular embodiment illustrated herein, a four-wheel drive shift actuator 84 is used to selectively move four-wheel drive shift sleeve 81 as desired. Actuator 84 may be connected to a handle, lever, or other means to be controlled by the driver.

A first drive sprocket 60 is coaxially and rotatably supported on a central portion of intermediate drive shaft 14 and is connected by a drive chain or belt 61 (FIG. 1) to drive a second drive sprocket 62 rotatably supported within transfer case 10. Second drive sprocket 62 is secured for rotation with front output shaft 18 by a splined connection or other means as is known in the art. First drive sprocket also contains external splines 63 to be drivingly coupled to internal splines 82 of four-wheel drive shift sleeve 81 as will be described more fully herein below.

As may be seen more clearly in FIG. 3, a first friction plate set is defined and shown as one or more first or primary four-wheel friction plates 70 coaxially mounted about intermediate drive shaft 14 and secured, preferably at their perimeter, by a splined connection to rotate with first drive sprocket 60. A second friction plate set is defined and shown as one or more second or secondary four-wheel drive friction plates 72 interleaved with and maintained in frictional engagement with primary friction plates 70 by at least one spring as is discussed in more detail below to "pre-load" the four-wheel drive shift synchronizer 80. Each friction plate 70,72 includes an inner diameter 74 defining a central aperture capable of slidably receiving four-wheel drive shift sleeve 81. Secondary four-wheel drive friction plates 72 contain internal splines 73 to engage external splines 83 of four-wheel drive shift sleeve 81 when four-wheel drive shift sleeve 81 is slid axially rearward as is shown above the axis A—A in FIGS. 1 and 3.

When the transfer case 10 is in two-wheel drive mode (as is shown below the axis A—A in FIG. 3), internal splines 82 of sleeve 81 are not engaged with external splines 63 of first drive sprocket 60. Therefore, intermediate drive shaft 14 is not coupled to sprocket 60. However, when four-wheel drive shift sleeve 81 is slid axially rearward as is shown above the axis A—A in FIGS. 1 and 3, external splines 83 of sleeve 81 engage internal splines 73 of secondary friction plates 72 in succession to allow the rotating intermediate drive shaft 14 to transfer torque to the primary friction plates 70 due to the frictional engagement of plates 70,72. Slippage will occur between plates 70,72 as they cooperate to smoothly urge first drive sprocket 60, and consequently second drive sprocket 62 and front output shaft 18, into rotation at some speed more closely corresponding to the speed of intermediate drive shaft 14. This synchronization between sprocket 60 and intermediate drive shaft 14 caused by friction plates 70,72 allows smooth engagement of internal splines 82 of four-wheel drive shift sleeve 81 and external splines 63 of first drive sprocket 60 to provide a direct coupling or engagement between sprocket 60, sleeve 81, and consequently intermediate drive shaft 14 when four-wheel drive shift sleeve is moved into its most axially rearward position (as is shown above the axis A—A in FIG. 3). Use of a two piece four-wheel drive shift sleeve 81 may provide an easier method of ensuring internal splines 82 of sleeve member 81a do not engage external teeth 63 of sprocket 60 until external splines 83 of sleeve member 81b are engaged with all secondary friction plates 72. Four-wheel drive shift synchronizer 80 may also help to provide a smooth on-thefly shift of the transfer case 10 from four-wheel drive into two-wheel drive by gradually reducing the rotational speed of sprocket 60 as sleeve 81 is moved axially forward to become successively disengaged from plates 72.

Primary four-wheel drive friction plates 70 and secondary four-wheel drive friction plates 72 are maintained in a preloaded frictionally engaged state by at least one spring which in the preferred embodiment illustrated is a Belleville type or disc spring 95 coaxially disposed about intermediate drive shaft 14. The torque capacity of four-wheel drive friction plate synchronizer 80 is defined by the equation set forth above in relation to the range shift synchronizer 20. For example, for use as the four-wheel drive shift synchronizer 80 of the invention, the friction plate 70,72 arrangement may be configured with R=2.5", r=2.0", $\mu$=0.1, n=8, and p=1000 lbs., providing a torque capacity of the friction plate arrangement of 150.617 lb-ft. For preloading of plates 70,72, a Belleville type disc spring 95 having a non-linear spring rate may be used to bias the friction plates 70,72 between spring 95 and a stop or reaction member 96. Alternatively, at least one coil spring may be used as is discussed above in relation to the range shift synchronizer 20.

While the foregoing description has set forth the preferred embodiments of the invention in particular detail, it must be understood that numerous modifications, substitutions and changes can be undertaken without departing from the true spirit and scope of the present invention as defined by the ensuing claims.

What is claimed is:

1. In combination with a drivetrain subassembly, a friction plate synchronizer to facilitate the synchronous coupling of a first rotatable member and a second rotatable member, said friction plate synchronizer comprising:

a first friction plate set including at least one first friction plate secured for rotation with said first rotatable member;

a second friction plate set including at least one second friction plate continuously maintained in frictional engagement with said first friction plate set by at least one spring, wherein said second friction plate set is selectively engageable with said second rotatable member such that upon engagement of said second rotatable member and said second friction plate set, said first friction plate set and said second friction plate set cooperate to facilitate the synchronous coupling of said first and second rotatable members.

2. The combination as recited in claim 1, wherein said drivetrain subassembly is a four-wheel drive torque transfer case, said first rotatable member is a torque input shaft to said transfer case, and said second rotatable member is a drive shaft of said transfer case including a range shift sleeve coupled for rotation with said drive shaft by a splined connection so as to be axially movable on said drive shaft.

3. The combination as recited in claim 2, wherein said at least one second friction plate includes a central aperture having internal splines and is capable of slidably receiving said range shift sleeve, and wherein said range shift sleeve includes external splines, such that said range shift sleeve becomes selectively engaged with said second friction plate when said range shift sleeve is slidably received within said central aperture of said at least one second friction plate.

4. The combination as recited in claim 2, wherein said torque input shaft has external splines, and said range shift sleeve includes internal splines, such that said external splines of said input shaft engage said internal splines of said range shift sleeve when said range shift sleeve is moved most axially forward to provide a direct drive relationship between said input shaft and said range shift sleeve.

5. The combination as recited in claim 1, wherein said at least one spring is a plurality of coil springs.

6. The combination as recited in claim 1, wherein, said drivetrain subassembly is a four-wheel drive torque transfer case, said second rotatable member is a drive shaft of said transfer case including a four-wheel drive shift sleeve coupled for rotation with said drive shaft by a splined connection so as to be axially movable along at least a portion of said drive shaft; and wherein, said first rotatable member is a drive sprocket coaxially and rotatably mounted about said drive shaft.

7. The combination as recited in claim 6, wherein said at least one second friction plate includes a central aperture having internal splines and is capable of slidably receiving said four-wheel drive shift sleeve, and wherein said four-wheel drive shift sleeve includes external splines, such that said four-wheel drive shift sleeve becomes selectively engaged to rotate with said at least one second friction plate when said four-wheel drive shift sleeve is slidably received within said central aperture of said at least one second friction plate.

8. The combination as recited in claim 6, wherein said drive sprocket includes external splines, and said four-wheel drive shift sleeve includes internal splines, such that said internal splines of said four-wheel drive shift sleeve engage said external splines of said drive sprocket when said four-wheel drive shift sleeve is moved most axially rearward to provide a direct drive relationship between said drive shaft and said drive sprocket.

9. The combination as recited in claim 1, wherein said at least one spring is a disc spring coaxially disposed about said drive shaft.

10. The combination as recited in claim 6, wherein said at least one spring is a disc spring coaxially disposed about said drive shaft.

11. A torque transfer case comprising:

first and second rotatable members wherein at least one of said first and second rotatable members includes an externally splined shift sleeve coupled to rotate therewith, said shift sleeve being axially movable on said rotatable member;

a first friction plate set including at least one first friction plate secured to rotate with the other of said first and second rotatable members; and, a second friction plate set including at least one second friction plate continuously maintained in frictional engagement with said first friction plate set by at least one spring, wherein said at least one second friction plate includes internal splines which are selectively engaged to said externally splined shift sleeve when said shift sleeve is moved into engagement therewith such that said first friction plate set and said second friction plate set cooperate to facilitate the synchronous coupling of said first and second rotatable members.

12. A torque transfer case as recited in claim 11, wherein said first rotatable member is a torque input shaft including a sun gear connected thereto and said second rotatable member is a drive shaft of said torque transfer case, wherein said at least one first friction plate is secured to rotate with said sun gear and said shift sleeve is a range shift sleeve coupled to said drive shaft.

13. A torque transfer case as recited in claim 12, wherein said at least one spring is a plurality of coil springs provided in a circumferentially spaced apart relationship about said drive shaft.

14. A torque transfer case as recited in claim 12, wherein said at least one spring is a disc spring.

15. A torque transfer case as recited in claim 11, wherein said first rotatable member is a drive shaft of said torque transfer case and said second rotatable member is a drive sprocket coaxially mounted for rotation about said drive shaft, wherein said at least one first friction plate is secured to rotate with said sprocket and said shift sleeve is a four-wheel drive shift sleeve coupled to said drive shaft.

16. A torque transfer case as recited in claim 15, wherein said at least one spring is a plurality of coil springs provided in a circumferentially spaced apart relationship about said drive shaft.

17. A torque transfer case as recited in claim 15, wherein said at least one spring is a disc spring coaxially disposed about said drive shaft.

* * * * *